United States Patent [19]
Rafie et al.

[11] Patent Number: 5,495,547
[45] Date of Patent: Feb. 27, 1996

[54] COMBINATION FIBER-OPTIC/ELECTRICAL CONDUCTOR WELL LOGGING CABLE

[75] Inventors: Saeed Rafie; Stephen T. Ha, both of Houston; Josephine Lopez, McAllen; James C. Hunziker, New Caney; Mark R. Doyle, Houston, all of Tex.

[73] Assignee: Western Atlas International, Inc., Houston, Tex.

[21] Appl. No.: 420,662

[22] Filed: Apr. 12, 1995

[51] Int. Cl.⁶ .............................. G02B 6/44; G01V 3/00
[52] U.S. Cl. .................... 385/101; 385/100; 385/106; 385/107; 385/109; 385/111; 385/112; 385/113; 340/854.7; 340/854.9
[58] Field of Search .................................. 385/100, 101, 385/104, 105, 106, 107, 109, 110, 111, 112, 113; 340/853.1, 854.5, 854.6, 854.7, 854.9; 174/70 R, 72 R

[56] References Cited

U.S. PATENT DOCUMENTS

| | | | |
|---|---|---|---|
| 4,504,112 | 3/1985 | Gould et al. | 385/101 X |
| 4,522,464 | 6/1985 | Thompson et al. | 385/101 X |
| 4,552,432 | 11/1985 | Anderson et al. | 385/101 X |
| 4,575,184 | 3/1986 | Ueno et al. | 385/101 X |
| 4,645,298 | 2/1987 | Gartside, III | 385/106 X |
| 4,651,917 | 3/1987 | Gould et al. | 385/101 X |
| 4,696,542 | 9/1987 | Thompson | 385/101 X |
| 4,976,509 | 12/1990 | Bachmann et al. | 385/101 X |
| 5,140,319 | 8/1992 | Riordan | 340/854.9 |
| 5,150,443 | 9/1992 | Wijnberg | 385/107 |
| 5,202,944 | 4/1993 | Riordan | 385/101 |
| 5,355,128 | 10/1994 | Riordan | 340/854.7 |
| 5,408,560 | 4/1995 | Seynhaeve et al. | 385/101 |

FOREIGN PATENT DOCUMENTS

| | | | |
|---|---|---|---|
| 58-33206 | 2/1983 | Japan | 385/101 X |
| 665047A5 | 4/1988 | Switzerland | 385/101 X |
| WO9428450 | 12/1994 | WIPO | 385/101 |

OTHER PUBLICATIONS

Brochure: Electro–Optical–Mechanical Umbilicals, Vector Cable U.S.A.

Randall, E. N., Di Mauro. M. J., Manufacturing and Testing of Armored Fiber Optical Downhole Logging Cable, Wire Journal (Sep. 1980), pp. 166–168.

*Primary Examiner*—Brian Healy
*Attorney, Agent, or Firm*—Richard A. Fagin

[57] ABSTRACT

The present invention is a well logging cable including first conductor elements, each of the first elements consisting of a steel wire surrounded by copper strands and covered in an electrically insulating material, and at least one second conductor element including at least one optical fiber enclosed in a metal tube, copper strands surrounding the tube and the strands covered by the electrically insulating material. The first elements and the at least one second element are arranged in a central bundle. The second conductor element is positioned within the bundle so as to be helically wound around a central axis of the bundle. The bundle is surrounded by armor wires helically wound externally to the bundle.

12 Claims, 2 Drawing Sheets

COMBINATION FIBER-OPTIC/ELECTRICAL CONDUCTOR WELL LOGGING CABLE

BACKGROUND OF THE INVENTION

1. Field of the Invention

The present invention is related to the field of armored cables used in electrical logging of oil and gas wells. More specifically, the present invention is related to a design for a combination electrical and fiber-optic cable used to lower logging instruments into wellbores drilled into the earth.

2. Description of the Related Art

Well logging is known in the an for providing measurements of properties of earth formations penetrated by wellbores. Well logging includes inserting measuring instruments into the wellbore, the instruments being connected to one end of an armored electrical cable. The armored electrical cables known in the art typically comprise at least one insulated electrical conductor which is used both to supply electrical power to the instruments and to transmit signals generated by the instruments to other equipment located at the earth's surface for decoding and interpreting the signals. The cables known in the art further comprise steel armor wires helically wound around the electrical conductor to provide tensile strength and abrasion resistance to the cable.

The signals generated by the instruments for transmission to the earth's surface are typically electrical signals. The signals can be in the form of analog voltages or digital pulses. A drawback to using electrical signals in well logging is that the mechanical requirements imposed on the logging cable, for example, relatively high bending flexibility and low weight per unit length, require that the cable and the electrical conductor be formed from wires generally having small diameter. A typical well logging cable, for example, comprises an electrical conductor consisting of seven strands of 0.0128 inch diameter copper wire covered by a 0.096 inch external diameter plastic insulator. The electrical conductor is typically characterized by a resistance of about 9 ohms per 1,000 feet of conductor and has a capacitance of several picofarads per foot of conductor.

Other cables known in the art can include a plurality of conductors arranged in a central bundle, each conductor having about the same construction and electrical characteristics as the conductor used in the single conductor cable.

Because of the electrical properties of the conductors in typical well logging cables, the well logging cables known in the art typically cannot effectively transmit electrical signals at frequencies above 100 kilohertz (kHz). Newer types of well logging instruments can generate data at rates which make using electrical signal transmission difficult and expensive.

It is known in the art to provide optical fibers in well logging cables to enable use of optical telemetry, which is capable of much higher frequencies and data transmission rates than is electrical signal transmission. For example, U.S. Pat. No. 4,696,542 issued to Thompson, describes a well logging cable having optical fibers disposed substantially centrally within helically-wound, copper-clad steel conductors, the conductors themselves covered by two layers of contra-helically wound steel armor wires. A drawback to the well logging cable described in the Thompson '542 patent is that the optical fibers are encased in a plastic tube. Well logging cables can be exposed to hydrostatic pressures and to temperatures in the wellbore which are high enough to preclude the use of the plastic tube as disclosed in the Thompson '542 patent.

Other fiber optic cables known in the art include enclosing the optical fibers in a steel tube. For example, "Electro-Optical Mechanical Umbilicals", Vector Cable, Sugar Land, Tex. (publication date unknown) discloses several so-called "towing and umbilical" cables which include steel tubes enclosing the optical fibers. A drawback to the combination electrical/optical fiber cables described in the vector Cable reference is that the cable designs disclosed therein have very large diameter electrical conductors which are intended to be used only for electrical power transmission; the optical fibers perform substantially all the signal communication functions of the cable. For reasons known to those skilled in the art, use of the large diameter power conductors as disclosed in the Vector Cable reference results in a cable having such a large external diameter that use of certain fluid pressure control equipment is precluded.

The cables disclosed in the Vector Cable reference also have substantially different electrical signal transmission characteristics than do well logging cables known in the an because of the large size of the power conductors. It is also desirable to provide a combination electrical/fiber optic cable having electrical conductors capable of maintaining the electrical signal transmission capabilities of the electrical logging cables known in the an so that existing well logging instruments using electrical telemetry need not be redesigned.

A combination fiber-optic/electrical well logging cable having the optical fiber enclosed in a steel tube is disclosed for example in U.S. Pat. No. 4,522,464 issued to Thompson et al. The cable disclosed in the '464 patent provides an optical fiber enclosed in a steel tube disposed in the center of a well logging cable. A drawback to the cable disclosed in the '464 patent is that conductive members, positioned externally to the central tube containing the optical fiber, are constructed of copper clad steel wire in order to provide strength and inelastic strain resistance to the cable. Copper clad steel wire typically has different electrical impedance than does copper wire of similar electrical conductance. The conductor members in the cable of the '464 patent can be difficult to use for the electrical signal transmission schemes known in the art.

In another embodiment of logging cable disclosed in the '464 patent, one or more of the copper clad steel conductors can be substituted by optical fibers. A drawback to directly substituting optical fibers for conductor elements as disclosed in the '464 patent is that some of the electrical power and signal transmission capability of the logging cable will be lost since the substituted conductors are substituted by a non-conductive element, namely the optical fiber.

A further drawback to the cable disclosed in the Thompson et al '464 patent is that steel tube used to enclose the optical fiber is subject to inelastic strain and eventual failure as a result of repeated applications and relaxations of axial tension to the cable. The tube, positioned in the center of the cable as disclosed in the '464 patent, is subject to greater axial elongation under tension than any of the armor wires since the armor wires are helically wound around the axis of the cable and therefore enable elongation of the cable by unwinding of the helical lay of the armor wires under axial tension.

Another type of combination fiber/optic electrical well logging cable is described in "Manufacturing and testing of armored fiber optic downhole logging cable" by Randall et al, Wire Journal, September 1980. The cable disclosed in the Randall et al article provides plastic-sheathed optical fiber to replace one or more of the electrical conductors. A drawback to the cable in the Randall et al article is that the optical fiber is subject to fluid pressure in the wellbore since it is not pressure sealed. Another drawback to the cable in the Randall et al article is that some of the electrical conductors are replaced by optical fibers. The electrical transmission characteristics of a cable built according to the Randall et al design may not have suitable electrical transmission properties for use with certain well logging instruments.

Another combination fiber optic/electrical well logging cable is disclosed in international patent application number WO 94/28450 published under the Patent Cooperation Treaty. The cable disclosed in the WO 94/28450 application includes an optical fiber enclosed in a metal tube. The metal tube can be surrounded by braided copper strands which are used to conduct electrical power and electrical signals. An embodiment of the cable disclosed in the WO 94/28450 application includes application of the copper braids directly to the metal tube. A drawback to the cable disclosed in the WO 94/28450 application is that the tube is positioned at the center of the cable. Positioning the tube at the center of the cable, as previously explained, can subject the tube and the optical fiber to excessive axial strain under certain conditions. Furthermore, the cable disclosed in the WO 94/28450 application does not disclose or suggest a configuration of the metal tube and copper braids to provide electrical impedance characteristics similar to the insulated copper wires of the electrical well logging cables known in the art. In fact, the preferred embodiment of the cable in the WO 94/28450 application provides a layer of insulating material between the metal tube and the copper braids.

As is understood by those skilled in the art, well logging cables typically include electrical conductors and external armor wires which are respectively positioned to maintain a substantially round cross-sectional shape of the cable even after repeated applications and relaxations of substantial axial tension to the cable while further subjecting the cable to significant bending stresses. As is understood by those skilled in the art, the applications and relaxations of axial tension and bending stresses occur as a result of lowering the instruments into the wellbore and later removing them from the wellbore by winding and unwinding the cable through various sheaves which direct the cable into the wellbore from winch equipment provided for spooling and unspooling the cable. The well logging cables known in the art having only electrical conductors provide good maintenance of the round cross-section of the cable because all of the conductors have similar tensile and bending properties. Direct substitution of conductors with optical fibers to provide a logging cable having optical fibers will result in the cable having asymmetrical tensile and bending properties, and possibly reduced resistance to deformation of the circular cross-section of the cable.

Accordingly, it is an object of the present invention to provide a well logging cable having at least one optical fiber, the cable having mechanical configuration and mechanical properties similar to those of the electrical well logging cables known in the art.

It is a further object of the present invention to provide a well logging cable having at least one optical fiber in an assembly which has electrical power and signal transmission capabilities similar to the well logging cables known in the art.

SUMMARY OF THE INVENTION

The present invention is a well logging cable including first elements, each of the first elements consisting of a steel wire surrounded by copper strands and covered in an electrically insulating material, and at least one second element including at least one optical fiber enclosed in a metal tube, copper strands surrounding the tube and covered by said electrically insulating material. The first elements and the at least one second element are arranged in a central bundle. The second element is positioned in the bundle so as to be helically wound around a central axis of the bundle. The bundle is surrounded by armor wires helically wound externally to the bundle.

In a specific embodiment of the invention, the steel wire can covered with metallic copper.

DESCRIPTION OF THE PREFERRED EMBODIMENT

Figure 1:
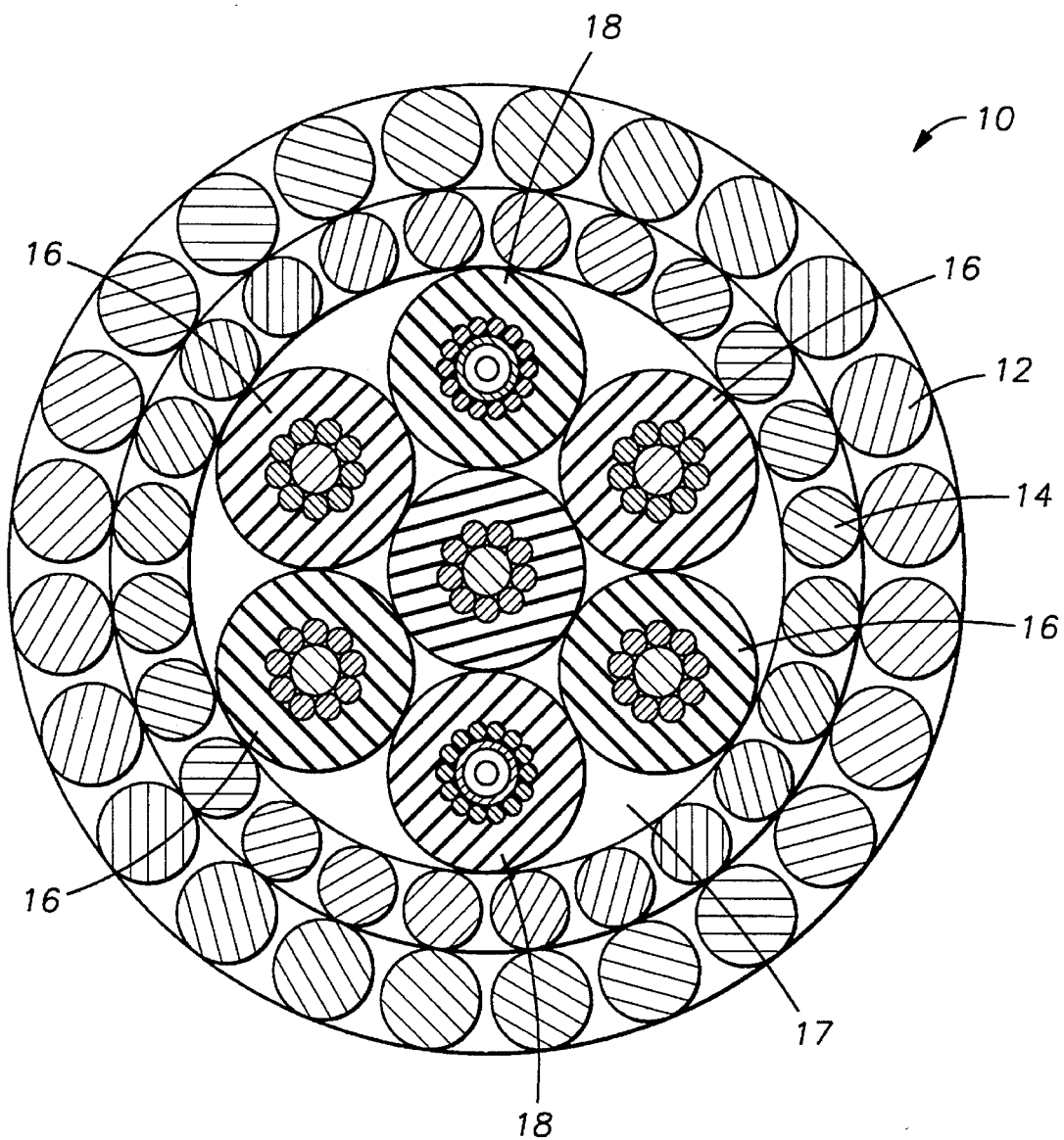
FIG. 1 shows a cross-section of a well logging cable according to the present invention.

A cross-section of a well logging cable 10 according to the present invention is shown in FIG. 1. The cable 10 includes seven, plastic-insulated conductor elements, as will be further explained. The seven elements are typically positioned in a central bundle 15 having a substantially regular hexagonal pattern, wherein six of the elements surround the seventh element, an arrangement of elements familiar to those skilled in the art and intended to provide a significant amount of resistance to deformation of the substantially circular cross-section of the cable 10. Five of the seven elements, called first elements and shown generally at 16, can be insulated electrical conductor elements including a copper covered steel wire which can be about 0.027 inches diameter surrounded by nine copper wires each of which can be about 0.0128 inches diameter. The first elements 16 can include an exterior insulating jacket which can be composed of heat and moisture resistant plastic such as polypropylene or ethylene-tetrafluoroethylene copolymer ("ETFE") sold under the trade name "TEFZEL" which is trade name of E. I. du Pont de Nemours & Co.

The other two of the seven elements, called second elements and shown generally at 18, each can include, among other things, an optical fiber disposed within a stainless-steel tube, as will be further explained. The second elements 18 are intended to provide optical fibers to the cable 10 and to have electrical and mechanical properties substantially the same as the five first elements 16. The cable 10 of the present invention includes two symmetrically positioned ones of the second elements 18, however it is contemplated that the cable 10 of the present invention will perform as intended with the second elements 18 positioned at any or all of the six externally positioned locations on the regular hexagonal pattern formed by the seven elements.

The void spaces within the hexagonal structure of the seven elements 16, 18 can be filled with a filler material, shown at 17, which can be a plastic such as neoprene or ETFE. The filler 17 maintains the relative position of the seven elements 16, 18 within the cable 10. The elements 16, 18 and the filler 17 are covered with helically-wound galvanized steel armor wires, formed into an inner armor sheath, shown at 14. The inner armor 14 is itself externally covered with helically-wound galvanized steel armor wires formed into an outer armor sheath, as shown at 12. The construction of the inner armor 14 and the outer armor 12 can be of a type known to those skilled in the art, and the armor construction is designed to provide significant tensile strength and abrasion resistance to the cable 10. As is known in the art, on a particular cable 10 which is intended to be used in a chemically hostile environment such as a wellbore having significant quantities of hydrogen sulfide, the armor wires 12, 14 alternatively can be composed of a cobalt-nickel alloy such as one identified by industry code MP-35N.

Figure 2:
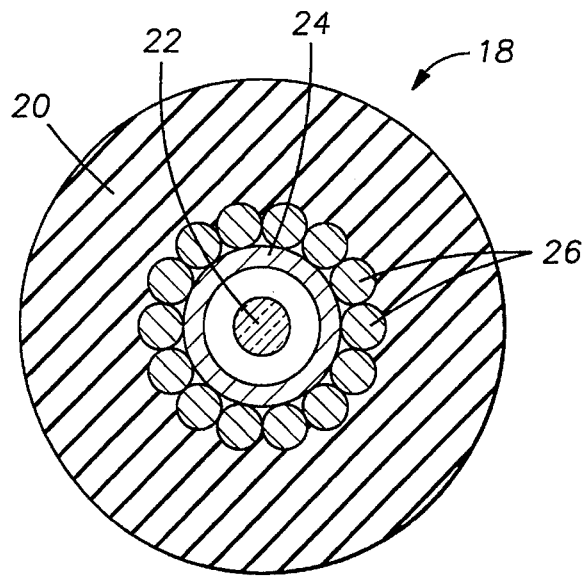
FIG. 2 shows a detailed cross-section of a fiber-optic/electrical conductor element of the cable according to the present invention.

One of the second elements 18 is shown in more detail in FIG. 2. The second element 18 can consist of an optical fiber 22 enclosed in a metal tube 24, which in the present embodiment preferably is composed of stainless steel in order to provide corrosion resistance. The tube 24 can have an external diameter of 0.033 inches and in internal diameter of 0.023 inches. The tube 24 provides abrasion and bending protection to the optical fiber 22, and excludes fluids in the wellbore (not shown) into which the cable (10 in FIG. 1) is extended when in use. The tube 24 can be copper plated to reduce its electrical resistance. The tube 24 can be surrounded by twelve copper wire strands shown generally at 26. The wire strands 26 each can be 0.01 inches in diameter. The combination of the tube 24 and strands 26 provides a conductor having an electrical resistance of less than 10 ohms per 1,000 foot length. The tube 24 and the copper strands 26 are further covered with plastic insulation 20 which can be composed of a heat-resistant plastic such as ETFE or polypropylene. The external diameter of the insulation 20 on the second element 18 is substantially the same as the external diameter of the insulation on the first element 16, so that the hexagonal pattern of the seven elements as shown in the cross-section of FIG. 1 can substantially symmetrical, irrespective of the relative position of the second element 18 within the hexagonal pattern of the bundle 15.

It is to be understood that second elements 18 can be positioned at any one or all of the six-external positions of the hexagonal structure as shown in FIG. 1. The second element 18 is preferably placed in an external location on the hexagonal structure of the bundle 15 because the elements 16, 18 in the external locations are helically-wound around the element in the central position. As in understood by those skilled in the art, for reasons such as lateral reduction in pitch diameter with axial strain, unwinding of the helical lay and the longer overall length of the helically wound external elements relative to the length of the central element 18, the externally positioned elements 16, 18 undergo reduced axial strain relative to the axial elongation of the cable (shown in FIG. 1 as 10), thereby reducing the possibility of axial strain-induced failure of the tube 24 and the fiber 22. In the present embodiment of the invention, second elements 18 are positioned at two, external locations opposite to each other in the hexagonal pattern, as can be observed by referring back to FIG. 1.

Figure 3:
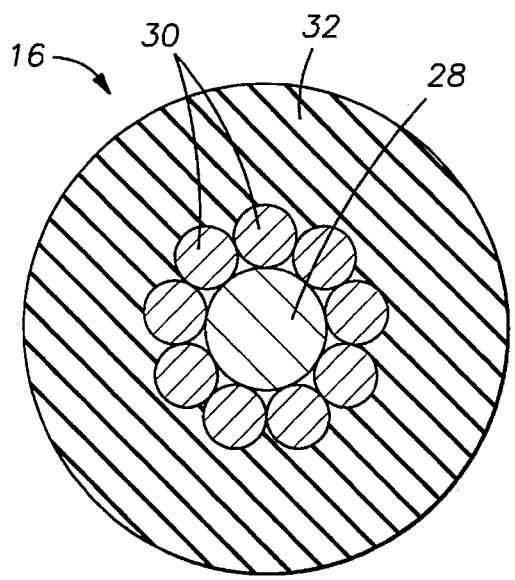
FIG. 3 shows a detailed cross-section of an electrical conductor element of the cable of the present invention.

FIG. 3 shows a cross-section of a first element 16 in more detail. The first element 16 can consist of a steel wire 28 which can be clad or plated with metallic copper to have an external diameter of about 0.027 inches, thereby reducing the electrical resistance of the wire 28. The copper-covered wire 28 can be further surrounded by nine copper strands, shown generally at 30 and having an external diameter of 0.0128 inches. The combination of the steel wire 28 and the copper strands 30 has an electrical resistance of less than 7 ohms per 1000 feet of length. The strands 30 can be covered with an electrical insulating material such as polypropylene or ETFE.

Referring back to FIG. 2, the second elements 18 are designed so that the combination of the tube 24 and wire strands 26 has an external diameter enabling the insulating material 20 to provide the second element 18 with substantially the same electrical capacitance per unit length as the first element 16. Therefore the assembled cable (shown in FIG. 1 as 10) will have substantially the same electrical power and signal transmission properties as does a well logging cable made according to the prior art.

While the present invention is directed to a logging cable having a total of seven of the first elements 16 and second elements 18 in the central bundle (shown as 15 in FIG. 1), it is contemplated that cables having other substantially symmetrical arrangements of first elements 16 and second elements 18 in the central bundle 15, in which the elements 16, 18 are helically wound around a central axis of the bundle 15, will also have the electrical and mechanical characteristics of a cable having only copper wires in the bundle, but will include at least one optical fiber positioned within the cable so as to minimize axial strain applied to the fiber.

What is claimed is:

1. A well logging cable comprising:

first conductor elements including a steel wire surrounded by copper strands, said copper strands covered by an electrically insulating material;

at least one second conductor element including at least one optical fiber enclosed in a metal tube, copper strands surrounding said tube, said copper strands covered by said electrically insulating material, wherein said first conductor elements and said at least one second conductor element are arranged in a central bundle, said at least one second conductor element positioned in said central bundle so as to be helically wound around a central axis of said bundle, said at least one second conductor element having electrical impedance substantially the same as one of said first conductor elements; and armor wires helically wound around said bundle.

2. The cable as defined in claim 1 wherein said insulating material comprises ETFE.

3. The cable as defined in claim 1 wherein said insulating material comprises polypropylene.

4. The cable as defined in claim 1 wherein said metal tube comprises stainless steel.

5. The cable as defined in claim 1 wherein said steel wire is covered with metallic copper.

6. The cable as defined in claim 1 wherein said bundle comprises a total number of seven conductor elements consisting of said first conductor elements and at least one of said second conductor elements.

7. The cable as defined in claim 6 wherein said bundle comprises two of said second conductor elements and five of said first conductor elements, said bundle arranged in a substantially regular hexagonal pattern so that said two of said second conductor elements are positioned opposite each other and helically wound around a centrally positioned one of said first conductor elements.

8. The bundle as defined in claim 7 further comprising a filler material disposed within void spaces within said substantially regular hexagonal pattern.

9. The bundle as defined in claim 8 wherein said filler material comprises polypropylene.

10. The cable as defined in claim 1 wherein said armor wires comprise galvanized steel.

11. The cable as defined in claim 1 wherein said armor wires comprise two coaxial contiguous layers of helically wound wires.

12. The cable as defined in claim 1 or claim 11 wherein said armor wires comprise a cobalt-nickel alloy.

\* \* \* \* \*